United States Patent
Zohar et al.

(10) Patent No.: US 7,979,613 B2
(45) Date of Patent: Jul. 12, 2011

(54) PERFORMANCE OF A STORAGE SYSTEM

(75) Inventors: Ofir Zohar, Alfe-Menashe (IL); Shemer Shimon Schwarz, Tel-Aviv (IL); Efraim Zeidner, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 12/182,567

(22) Filed: Jul. 30, 2008

(65) Prior Publication Data

US 2009/0037924 A1 Feb. 5, 2009

Related U.S. Application Data

(63) Continuation-in-part of application No. 11/182,338, filed on Jul. 15, 2005.

(60) Provisional application No. 60/953,233, filed on Aug. 1, 2007.

(51) Int. Cl.
*G06F 13/12* (2006.01)
*G06F 13/38* (2006.01)

(52) U.S. Cl. ............ 710/74; 710/57; 711/163; 711/154; 718/105

(58) Field of Classification Search .................... 710/74, 710/57, 56, 52; 711/114, 163, 154; 718/105
See application file for complete search history.

(56) References Cited

U.S. PATENT DOCUMENTS

| | | | |
|---|---|---|---|
| 6,112,257 A | 8/2000 | Mason, Jr. et al. | |
| 6,148,349 A * | 11/2000 | Chow et al. | 710/33 |
| 6,247,077 B1 * | 6/2001 | Muller et al. | 710/74 |
| 6,611,896 B1 | 8/2003 | Mason, Jr. et al. | |
| 7,010,655 B1 * | 3/2006 | Harmer et al. | 711/163 |
| 7,028,156 B1 | 4/2006 | Kiselev et al. | |
| 7,124,266 B1 * | 10/2006 | Harmer et al. | 711/163 |
| 7,219,203 B2 | 5/2007 | Zohar et al. | |
| 7,779,368 B2 * | 8/2010 | Wichelman et al. | 715/833 |
| 7,836,250 B2 * | 11/2010 | Zohar et al. | 711/114 |
| 2001/0025313 A1 | 9/2001 | Feng et al. | |
| 2005/0015566 A1 * | 1/2005 | Zohar et al. | 711/203 |
| 2005/0015567 A1 | 1/2005 | Zohar et al. | |
| 2005/0015658 A1 | 1/2005 | Zohar et al. | |
| 2005/0060445 A1 * | 3/2005 | Beukema et al. | 710/52 |
| 2005/0278476 A1 * | 12/2005 | Teske et al. | 711/100 |
| 2007/0016726 A1 * | 1/2007 | Zohar et al. | 711/114 |
| 2008/0059750 A1 * | 3/2008 | Ogawa | 711/170 |

* cited by examiner

*Primary Examiner* — Chun-Kuan Lee
*Assistant Examiner* — Ernest Unelus
(74) *Attorney, Agent, or Firm* — Griffiths & Seaton PLLC (57) ABSTRACT

A method for operating a storage system, including storing data redundantly in the system and measuring respective queue lengths of input/output requests to operational elements of the system. The queue lengths are compared to an average queue length to determine respective performances of the operational elements of the storage system. In response to the average queue lengths and a permitted deviation from the average an under-performing operational element among the operational elements is identified. An indication of the under-performing operational element is provided to host interfaces in the storage system. One of the host interfaces receives requests for specified items of the data directed to the under-performing element, and in response to the indication, some of the requests are diverted from the under-performing operational element to one or more other operational elements of the storage system that are configured to provide the specified items of the data.

18 Claims, 5 Drawing Sheets

PERFORMANCE OF A STORAGE SYSTEM

CROSS-REFERENCE TO RELATED APPLICATIONS

This application is a continuation-in-part of and claims the benefit of U.S. Non-Provisional Patent Application No. 11/182,338, filed Jul. 15, 2005, which claims the benefit of U.S. Provisional Patent Application No. 60/953,233, filed Aug. 1, 2007, both of which are is incorporated herein by reference.

FIELD OF THE INVENTION

The present invention relates generally to methods for data storage, and specifically to improving the performance of a data storage system.

BACKGROUND OF THE INVENTION

As demands on a data storage system increase, any lowering of performance of the system becomes more critical, as well as typically becoming more noticeable to users of the system. A method that improves the performance of such a system is thus desirable.

SUMMARY OF THE INVENTION

In an embodiment of the present invention, a method for operating a storage system is provided. The method consists of storing data redundantly in the storage system, and measuring respective queue lengths of input/output requests to operational elements of the storage system. The respective queue lengths are compared to an average of the queue lengths so as to determine respective performances of the operational elements of the storage system. In response to the average of the queue lengths and a permitted deviation from the average, an under-performing operational element among the operational elements is identified, and an indication of the under-performing operational element is provided to host interfaces in the storage system.

The host interfaces receive requests at one of the host interfaces for specified items of the data directed to the under-performing element, and in response to the indication, some of the requests are diverted from the under-performing operational element to one or more other operational elements of the storage system that are configured to provide the specified items of the data.

In an alternative embodiment of the present invention, an alternative method for operating a storage system is provided. The alternative method consists of storing data redundantly in the storage system, and measuring respective queue lengths of input/output requests to operational elements of the storage system. The respective queue lengths are compared to an average of the queue lengths so as to determine respective performances of the operational elements of the storage system. In response to the average of the queue lengths and a permitted deviation from the average, an over-performing operational element among the operational elements is identified, and an indication of the over-performing operational element is provided to host interfaces in the storage system.

The host interfaces receive requests at one of the host interfaces for specified items of the data directed to one or more of the operational elements other than the over-performing element. In response to the indication, confirmation is provided that the over-performing element is configured to provide at least some of the specified items of the data in response to at least one of the requests, and these are diverted to the over-performing element.

In a further alternative embodiment of the present invention, a further alternative method for operating a storage system is provided. The further alternative method consists of storing data redundantly in the storage system, and measuring respective queue lengths of input/output requests to operational elements of the storage system. The respective queue lengths are compared to an average of the queue lengths so as to determine respective performances of the operational elements of the storage system. In response to the average of the queue lengths and a first permitted deviation from the average, an under-performing operational element among the operational elements is identified. In response to the average of the queue lengths and a second permitted deviation from the average, an over-performing operational element among the operational elements is identified.

Indications of the under-performing operational element and of the over-performing operational element are provided to host interfaces in the storage system. Requests are received at one of the host interfaces for specified items of the data directed to the under-performing element. In response to the indications, confirmation is provided that the over-performing element is configured to provide at least some of the specified items of the data in response to at least one of the requests, and these are diverted to the over-performing operational element.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF EMBODIMENTS

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented pro-gramming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

System Architecture

Figure 1:
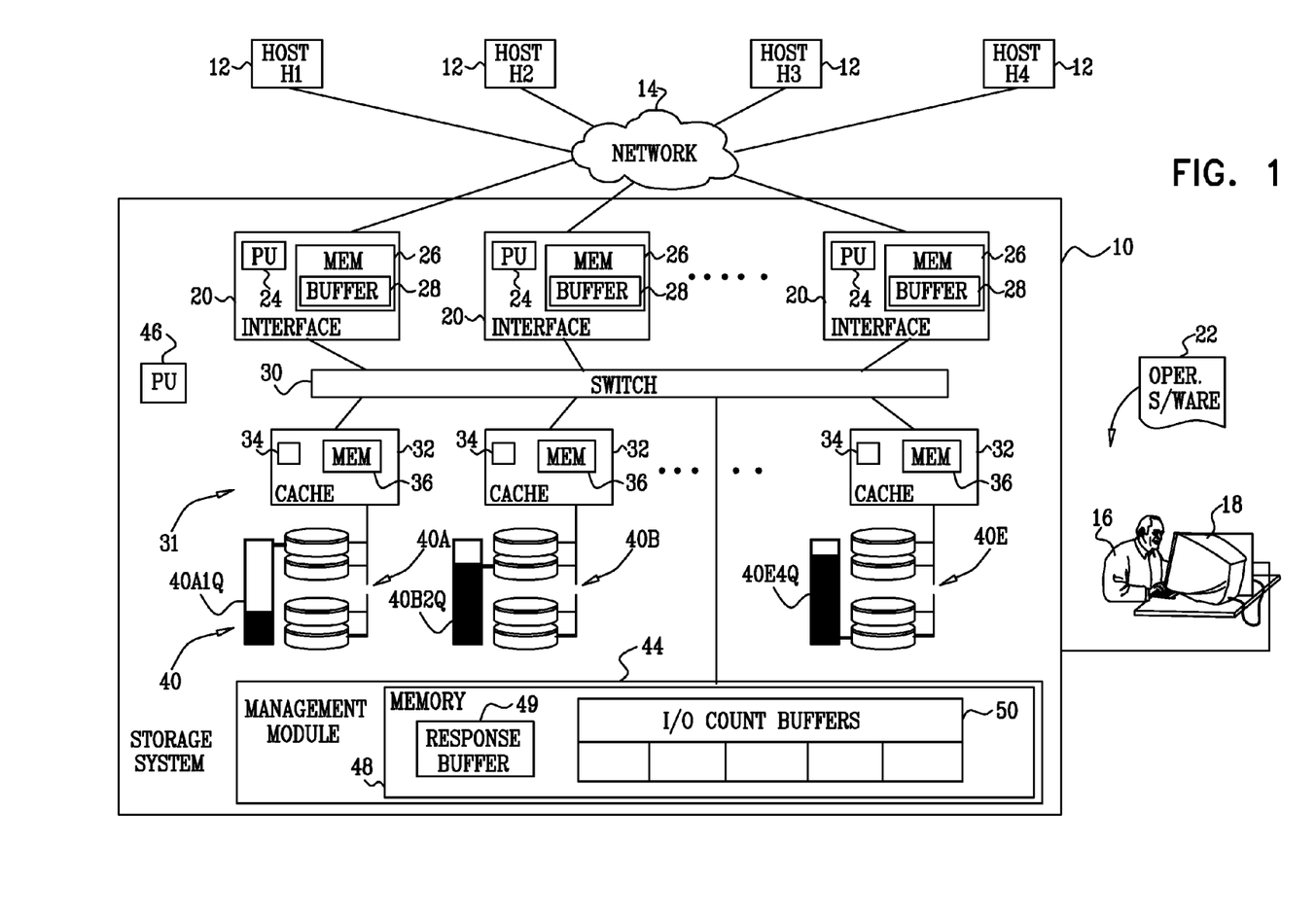
FIG. 1 is a schematic block diagram of a data storage system, in accordance with an embodiment of the present invention.

Reference is now made to FIG. 1, which is a schematic block diagram of a data storage system 10, according to an embodiment of the present invention. System 10 is coupled to one or more generally similar hosts 12, also referred to herein as hosts H1, H2, H3, H4, which store data on system 10 and read the stored data from the system. Hosts 12 are typically coupled to system 10 via a network 14, such as the Internet, although any other form of coupling, such as a direct coupling from one or more of hosts 12 to system 10 may be used. The coupling may be wired, fiber optic or other guided wave carrier, or wireless coupling. System 10 may comprise a localized system, wherein components of system 10 are located within a single physical location. Alternatively, system 10 may comprise distributed elements, with system elements separated from each other physically, but communicating with each other via network 14, as described hereinabove. Further alternatively, system 10 may comprise one or more localized systems coupled to each other and to one or more distributed systems.

System 10 is operated by one or more processing units (PUs) 46, which may be localized or distributed within the system, and which may operate separately from, or in conjunction with, other processing units described herein. Herein, by way of example, system 10 is assumed to comprise a localized system having one localized processing unit 46.

System 10 is configured by an operator 16, who typically uses a workstation 18, connected to system 10, to operate system 10 using system operation software 22. Typically, system 10 operates automatically after operator 16 completes the configuration. Software 22 comprises functions which enable system 10 to implement the embodiments described herein. Software 22 may be stored in workstation 18, in system 10, or software 22 may be distributed across both workstation 18 and system 10. Software 22 may be provided to workstation 18 in electronic form or on tangible media such as a magnetic storage disk or a compact disk which are readable by a computer, or by other means known in the art for permanent storage of electronic data.

System 10 comprises one or more generally similar interfaces 20, which act as communication ports between hosts 12 and operational elements 31, also herein termed storage elements 31 of system 10. Processing unit 46 monitors at least some of operational elements 31. Interfaces 20 may be coupled to storage elements 31 by a switch 30, as described in more detail hereinbelow. However, any convenient form of coupling may be used to connect interfaces 20 with storage elements 31. Interfaces 20 transfer data from hosts 12 to system 10 for storage and requests for items of the data from hosts 12 to system 10. Interfaces 20 also transfer data from system 10 to hosts 12 in response to requests for items of the data.

Each of interfaces 20 comprises an interface processing unit 24, and a memory 26. Memory 26 includes one or more of buffers 28, which are used by interface processing unit 24 to store data, and requests for the data, prior to transmittal of the data or the requests for data to hosts 12 or to other elements of system 10. Memory 26 also includes respective flags 45 representing each of storage elements 31 that are monitored by each of interfaces 20. As described in detail hereinbelow, each of interfaces 20 checks respective flags 45 before forwarding requests for items of the data received from hosts 12 to elements 31.

Storage elements 31 comprise generally similar caches 32. Storage elements 31 also comprise generally similar groups 40 of non-volatile storage devices, the devices typically comprising disks that use magnetic media to store data. However, groups 40 may comprise any other convenient non-volatile storage device, such as, but not limited to, magnetic tape and/or optical disks. By way of example, each group 40 is coupled to one of caches 32. U.S. Patent Application No. 2005/0015567, which is assigned to the assignees of the present invention and which is incorporated herein by reference, describes other possible methods for coupling caches 32 to groups 40.

In the present application, groups 40 are distinguished from each other using a suffix letter, so that system 10 may comprise groups 40A, 40B, 40C, 40D and 40E. Devices within a given group are distinguished from each other with a suffix numeral. By way of example, system 10 is assumed to comprise five groups 40A, 40B, 40C, 40D, and 40E, each of groups 40 comprising four devices. Thus in the present example, group 40A comprises devices 40A1, 40A2, 40A3, and 40A4, and group 40B comprises devices 40B1, 40B2, 40B3 and 40B4. The non-volatile storage devices are herein also referred to generically as devices 40Nn, where "N" represents a letter and "n" represents a number.

Each of caches 32 comprises its own cache controller 34 for the specific group 40 of storage devices attached to the cache. Each cache also comprises a cache memory 36. Cache memory 36 typically has a fast-access time to read and write data compared to a slow-access time for the same functions when performed by devices 40Nn. Each cache memory 36 is typically configured to store items of the data being transmitted to and from groups 40, and requests to read items of the data from groups 40, in the form of one or more queues.

By way of example, data stored in groups 40 is assumed to be grouped as specific partitions P1, P2, P3 ... Pn (not shown in the figure). Typically, grouping of the data is performed by operator 16 who defines partitions P1, P2, P3 ... Pn, and who associates the partitions with hosts 12. Under overall control of operator 16, system 10 assigns a specific number of addresses to each partition, wherein the data may be stored. Advantageously, the data of each given partition is spread evenly over a number of devices 40Nn. Methods for evenly spreading the data of a partition over devices 40Nn are described in U.S. Patent Application No. 2005/0015566, which is assigned to the assignees of the present invention and which is incorporated herein by reference. By way of example, devices 40Nn in system 10 are assumed to be generally configured as explained U.S. Patent Application No. 2005/0015566, so that groups of physical addresses of each device 40Nn are distributed amongst partitions of system 10.

In conjunction with commands from workstation 18, processing units 46 use a management module 44 to perform management operations for system 10. Functions typically performed by management module 44 are described in more detail in U.S. Patent Application No. 2005/0015658, which is assigned to the assignees of the present invention and which is incorporated herein by reference. Management module 44 also enables processing units 46 to provide overall operational control of the data I/O of system 10. Module 44 incorporates a management module memory 48, typically a non-volatile memory. Management module memory 48 comprises a response buffer 49, and I/O count buffers 50. The functions of buffers 49 and 50 are described below.

Data is stored redundantly in system 10. In one method for providing redundant storage, for a given data byte in a given location of system 10, one or more backup bytes of the given data byte are also stored. The backup bytes may be exact copies of the given byte, stored in different locations from the given location. Providing exact copies of stored data is a method for redundant storage that is exemplified by RAID (Redundant Array of Independent Disks) 0 and RAID 1 storage schemes.

In a second method for providing redundant storage, an exact copy of the given data byte is not stored, but an exact copy is reproducible from other backup data bytes, stored in different locations from the given location of the given data byte. The second method for redundant storage typically groups blocks of data together, and forms one or more parity blocks from the grouped data. A given data byte within one of the data blocks may be reproduced by using other data blocks and the one or more parity blocks. Such a method of storage is exemplified by RAID 3, RAID 4, RAID 5, and RAID 6 storage schemes.

Many variations on the described methods for storing data redundantly are known in the art. In addition, other methods for storing data redundantly exist, such as methods which are proprietary and/or may not have been published. Embodiments of the present invention may be implemented on storage systems that use substantially any method for redundantly storing data.

In system 10, processing units 46 use management module 44 to monitor the performance of some or all of storage elements 31, or groups of the storage elements. The performance of one of storage elements 31 may be measured in a number of different ways. For example, in order to measure the performance of one of caches 32, the length of its I/O queue may be measured. Alternatively, other performance measures may comprise measuring a maximum latency or an average latency of the I/O queue over a given period of time. Further alternatively, the amount of "dirty data" associated with the I/O queue may be used to measure the performance of one of caches 32. In the context of the application and the claims, dirty data is defined as data that is misleading, incorrect, or duplicated.

If one of storage elements 31 comprises a magnetic storage device, the performance of the magnetic storage device may be measured by methods similar to those described above for one of caches 32, or alternatively, by methods using a characteristic specific to the magnetic storage device, such as a parameter based on the time the magnetic storage device takes to access requested data. Other methods that may be used to measure performance of each specific storage element will be familiar to those skilled in the art, and all such methods are assumed to be comprised within the scope of the present invention.

As described in more detail hereinbelow, the measured performance of elements of system 10 is used to overcome a reduction in performance of one of the elements. After identifying an under-performing element, data requests for specified items of the data that are initially sent to the under-performing element are diverted to other elements that are not under-performing. The diversion of the data requests reduces the load on the under-performing element and improves the overall performance of the storage system.

Elements 31 comprise all devices 40Nn in system 10, each of the elements typically being monitored by management module 44. Each device 40Nn is assumed to have a respective I/O queue 40NnQ associated with the device. Each of interfaces 20 comprises flags 45. Flags 45 comprise respective flags 45Nn for each device 40Nn included within one of groups 40N, so that there is a flag 45Nn associated with each device 40Nn. Copies of each of associated flags 45Nn are stored in each of interfaces 20.

Hereinbelow, by way of example, the monitoring of devices 40A1, 40B2, 40C3, 40D4, and 40E4 is described, and those having ordinary skill in the art will be able to adapt the description, mutatis mutandis, to other monitored devices 40Nn in system 10. In system 10, each device 40A1, 40B2, 40C3, 40D4, and 40E4 has a respective I/O queue 40A1Q, 40B2Q, 40C3Q, 40D4Q, and 40E4Q. For clarity, only queues 40A1Q, 40B2Q, and 40E4Q are shown in FIG. 1. In addition, flags 45A1, 45B2, 45C3, 45D4, and 45E4 (for clarity, individual flags are not shown in FIG. 1) in each of interfaces 20 are set or cleared according to a state of devices 40A1, 40B2, 40C3, 40D4, and 40E4, as described below.

System Administration and Embodiments

Operator 16 sets up system 10 by configuring processing units 46 and management module 44 to operate a method for monitoring the performance of each device 40Nn. Herein, by way of example, the method is assumed to comprise management module 44 measuring the length of I/O queues 40NnQ of each of monitored devices 40Nn at predetermined intervals of time, herein assumed by way of example to be approximately 1 minute. Processing units 46 and management module 44 calculate an average length of the queues to use as a benchmark, and operator 16 defines a permitted deviation from the benchmark. Operation outside the permitted deviation is used to decide if a given device 40Nn is under-performing. A flowchart 100 (FIG. 2) describes a method for monitoring the performance of devices 40A1, 40B2, 40C3, 40D4, and 40E4 in more detail.

Operator 16 configures system 10 to follow a diversion procedure if management module 44 determines one of devices 40Nn to be under-performing. Herein, by way of example, operator 16 configures the diversion procedure to comprise management module 44 storing, on a periodic basis, counts of data requests sent by interfaces 20 to each of devices 40Nn. In the current example, the diversion procedure also comprises interfaces 20 diverting some of the data requests from an under-performing device 40Nn to a different one of devices 40Nn. Flowchart 200 (FIG. 3) describes such a diversion procedure in more detail hereinbelow.

Operator 16 may configure processing units 46 and management module 44 to operate other methods for monitoring the performance of each of devices 40Nn, to determine if any device is under-performing or over-performing. Operator 16 may also configure alternative diversion procedures for system 10 to follow if management module 44 determines one of devices 40Nn to be under-performing. The methods described herein for monitoring the performance of each of devices 40Nn, and the diversion procedure for system 10 to follow when management module 44 determines that one of devices 40Nn is under-performing are by way of example, and any other suitable method or procedure that is known in the art may be followed.

Figure 2:
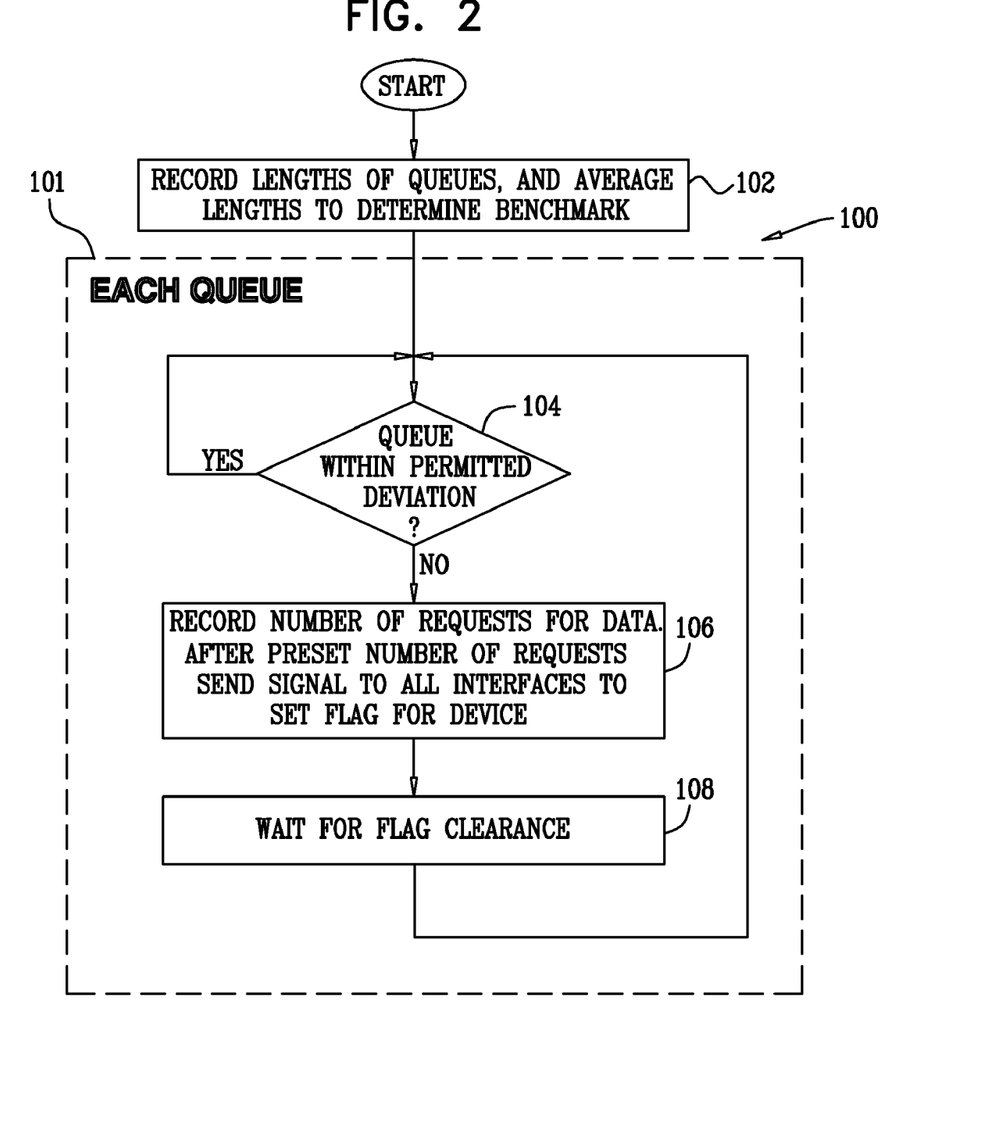
FIG. 2 is a flowchart of a method for monitoring the performance of a data storage system, in accordance with an embodiment of the present invention.

Reference is now made to FIG. 2, which is a flowchart 100 of a method for monitoring the performance of a data storage system, in accordance with an embodiment of the present invention. Flowchart 100 shows steps performed by processing units 46 and management module 44 to monitor the performance of devices 40Nn. The steps are typically performed in an iterative fashion.

In a first step 102, processing units 46 and management module 44 record the lengths of all I/O queues 40NnQ and calculate the average length of the I/O queues in order to generate a benchmark queue length. As a numerical example, the respective queue lengths recorded by processing units 46 and management module 44 for devices 40A1, 40B2, 40C3, 40D4, and 40E4, for the predetermined interval described hereinabove, are assumed to be 120, 105, 95, 103, and 97, respectively. Using the queue lengths, processing units 46 and management module 44 calculate the benchmark queue length as the average of the respective queue lengths. In the present example, the benchmark queue length has the value 104. The numerical examples described herein are used in the following description of flowchart 100.

Processing units 46 and management module 44 perform the remaining steps of flowchart 100 separately for each queue 40nQ, as shown within a broken FIG. 101.

In a decision step 104, processing units 46 and management module 44 check if the queue length of a specific queue deviates from, i.e., is greater than, the permitted deviation from the benchmark configured by operator 16 as described hereinabove. By way of example, operator 16 is assumed to have configured the permitted deviation from the benchmark to be 10% of the benchmark queue length. The permitted deviation from the benchmark corresponds to a bound for an operating range of devices 40Nn.

If the queue length of the queue 40nQ is within the operating range configured by operator 16 as the permitted deviation from the benchmark, flowchart 100 returns to the beginning of decision step 104. Using the numerical examples above, the respective queue lengths for queues 40B2Q, 40C3Q, 40D4Q, and 40E4Q are all within the configured permitted deviation from the benchmark.

If the queue length of the queue 40nQ is greater than the operating range configured by operator 16 as the permitted deviation from the benchmark, the flowchart continues to a step 106. In the example described herein, the queue length recorded by processing units 46 and management module 44 for device 40A1 is 120. Thus, the queue length for queue 40A1Q has a value greater than the operating range, or permitted deviation, from the benchmark queue length configured by operator 16.

Figure 3:
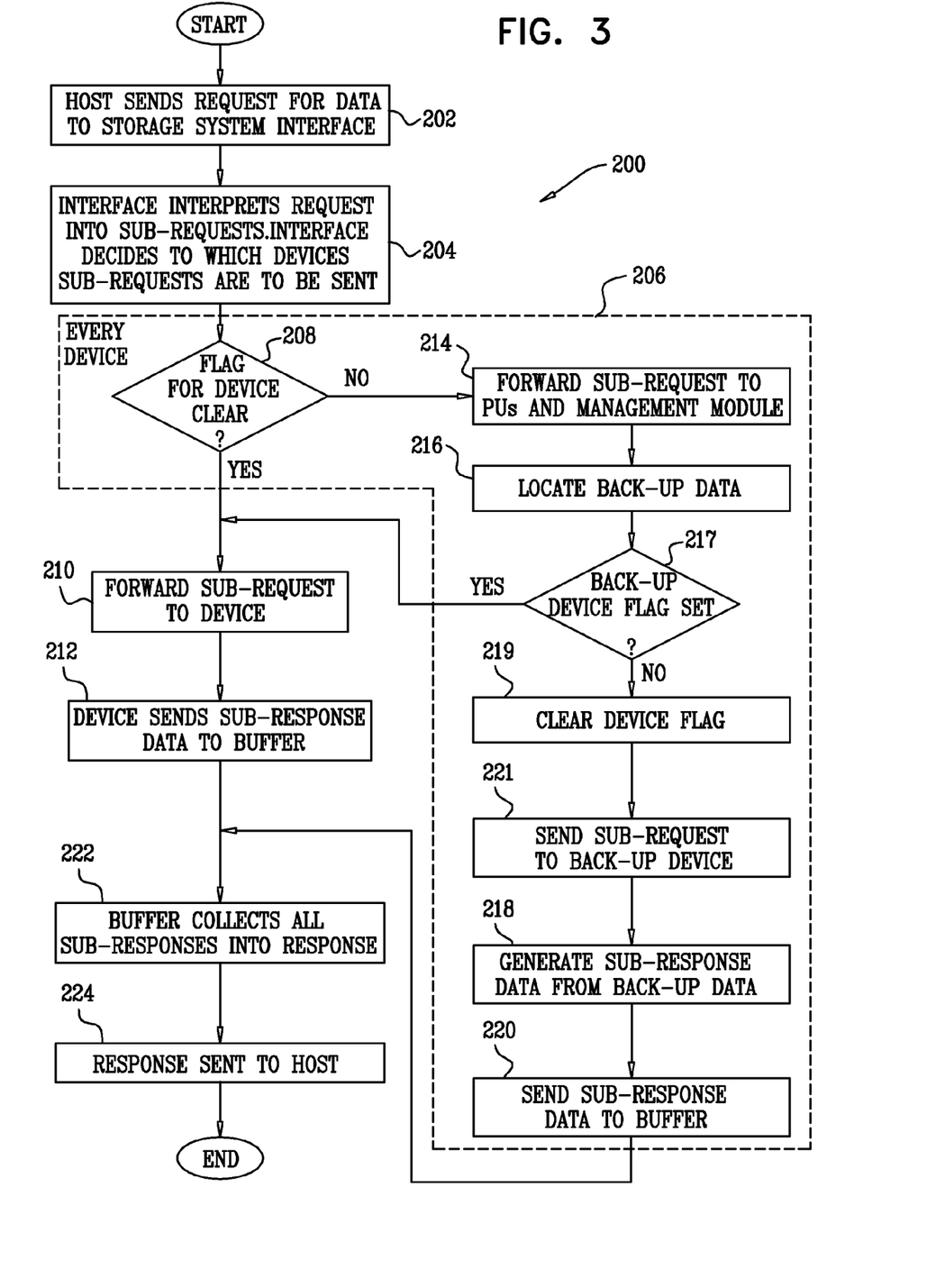
FIG. 3 is a flowchart of a method for compensating for an under-performing element of a data storage system, in accordance with an embodiment of the present invention

In a record step 106, processing units 46 and management module 44 begin counting the number of requests for specified items of data received by the corresponding device 40Nn, and storing the count of requests in I/O count buffers 50. A signal is sent by processing units 46 and management module 44 to all interfaces 20 after a given number of requests, typically configured by operator 16 and herein assumed to be twenty, is registered. As is illustrated in the description of flowchart 200 (below) the given number of requests corresponds to a preset fraction of the requests to be diverted from the under-performing device. In the current example, one request in twenty, or 5% of the requests to the under-performing device 40Nn, are diverted. Operator 16 typically configures the preset fraction of the requests at the beginning of operation of system 10.

The signal causes interfaces 20 to set flag 45Nn corresponding to the under-performing device 40Nn. Processing units 46 and management module 44 then reset the counter stored in I/O count buffers 50, and stops counting. Thus, for the numerical example considered here, flag 45A1 is set in each of interfaces 20, indicating that device 40A1 is currently under-performing and that it has received the set given number of requests. Flags 45B2, 45C3, 45D4, and 45E4 remain clear.

In a waiting step 108, processing units 46 wait for any flag 45Nn set in step 106 to be cleared. On clearance, flowchart 100 returns to the beginning of decision step 104.

Reference is now made to FIG. 3, which is a flowchart 200 of a process followed by system 10 to compensate for an under-performing element of the system, according to an embodiment of the present invention. The steps of flowchart 200 may be implemented by any convenient processing unit in system 10, such as interface processing unit 24, and/or one or more of processing units 46, typically operating with appropriate software. Herein, by way of example, flowchart 200 is assumed to be implemented by processing units 46 using management module 44.

In a first step 202, one of hosts 12 forwards a request for specific items of data to system 10. The specific items of data requested may include the smallest size of accessible data stored in system 10, typically one byte, but could be smaller, potentially as small as a single bit. However, the size of the specific items of data requested is substantially immaterial to the operation of system 10, and is typically significantly larger than the smallest size of accessible data. One of interfaces 20, herein referred to as a receiving interface, typically receives the request.

In an interpretation step 204, the receiving interface interprets the request into sub-requests. Each sub-request is normally sent by the receiving interface to a respective set of storage devices. In general, the interpretation generates one or more sub-requests, each sub-request comprising one or more requests for specific items of data from at least one device 40Nn. In the particular example considered here, the receiving interface is assumed to interpret the request into three sub-requests. A first sub-request normally being directed to device 40A1 in group 40A, a second sub-request normally being directed to device 40B2 in group 40B, and a third sub-request normally being directed to device 40C3 in group 40C.

In embodiments of the present invention, prior to directing the sub-requests to their respective devices, the receiving interface and/or processing units 46 and management module 44 perform the steps shown in a region 206 of the flowchart, for each device that the receiving interface has identified as a candidate for receiving a sub-request in step 204.

In a decision step 208, the receiving interface checks if the flag 45Nn is clear for the specific device 40Nn that the receiving interface has identified as a candidate for receiving a sub-request. If the flag 45Nn is clear, flowchart 200 continues at a step 210, wherein the receiving interface forwards the sub-request to its respective device 40Nn. Continuing the numerical example described above, flags 45B2 and 45C3 are clear, so that the second sub-request is forwarded by the receiving interface to device 40B2 in group 40B and the third sub-request is forwarded by the receiving interface to device 40C3 in group 40C.

In a sub-response step 212, each device receiving a sub-request sends sub-response data, in response to the sub-request, to response buffer 49. Thus, in the current example, buffer 49 receives sub-responses comprising items of the data from device 40B2 and device 40C3.

If in decision step 208 the flag for the specific device 40Nn is not clear, i.e., the flag 45Nn has been set, then flowchart 200 continues at a diversion step 214. The set flag indicates that the device corresponding to the flag is under-performing.

In the example herein, flag 45A1 is set, thus indicating that device 40A1 is under-performing.

In step 214, the sub-request that would normally be directed to a given device 40Nn in group 40N is instead diverted to processing units 46. In the current example, the first sub-request that would normally be directed to device 40A1, which is under-performing, is diverted to processing units 46.

In a location step 216 of flowchart 200, processing units 46 use management module 44 to locate the backup data for the sub-response data that would normally be provided by the under-performing device. The method for locating the backup data and for generating the sub-response, as described hereinbelow, depends on the method used in system 10 for providing redundant storage. If RAID 0 or RAID 1 is used in system 10 to provide redundant storage, whereby an exact copy of the backup data is stored, the copy of the backup data is located by management module 44. If RAID 3, RAID 4, RAID 5, or RAID 6 is used in system 10 to provide redundant storage, whereby the backup data comprises one or more other data blocks, typically including one or more parity blocks, management module 44 locates the one or more other data blocks that comprise the backup data. Regardless of the redundant storage method used in system 10 to provide a backup of the data required from the under-performing device to provide a sub-response to the first sub-request, in step 216 processing unit 46 uses management module 44 to locate the corresponding backup data.

In an optional decision step 217, the receiving interface and/or PUs 46 checks if any of the flags of the device or devices having the backup data are set, indicating that a respective device holding part or all of the backup data is under-performing. If any of the flags are set, flowchart 200 proceeds to step 210.

If none of the flags are set, showing that none of the devices needed to provide the backup data is under-performing, then in a clear flag step 219 the flag of the under-performing device, which was set, is cleared in all interfaces. In the example described herein, management module 44 clears flag 45A1. (Returning to FIG. 2, clearance of the flag means that the wait stage of step 108 concludes, so that flowchart 100 proceeds to decision step 104.)

If optional decision step 217 is not implemented, the flowchart proceeds directly from step 216 to step 219.

In a sub-request forwarding step 221, the sub-request is sent to the backup device or devices identified in step 216.

In a sub-response step 218 processing units 46 use management module 44 to generate the sub-response data from the backup data located by management module 44 in step 216. In the present example, the sub-requested data on device 40A1 may have been redundantly stored using a RAID 5 scheme applied over the five groups 40A, 40B, 40C, 40D, and 40E. In this case the backup data for the specific items of data required from device 40A1 to provide the sub-response to the first sub-request is located on devices in groups 40B, 40C, 40D, and 40E. Processing units 46 use management module 44 to access the devices and the backup data located in groups 40B, 40C, 40D, and 40E and generates the sub-response data from the backup data.

In a forwarding step 220, processing units 46 use management module 44 to send the sub-response data generated in step 218 to response buffer 49.

In concluding steps 222 and 224, on receipt of all the sub-responses into response buffer 49, processing units 46 use management module 44 to form a response comprising the specified items of data requested by the one of hosts 12, and forwards the response to the host.

Flowchart 200 then ends.

As exemplified by the description above, embodiments of the present invention measure the performance of elements of a storage system, and determine an under-performing element. Requests for data that would normally be directed to the under-performing element are diverted from the under-performing element to other elements of the system. The diversion is implemented even though the requested items of data are still accessible on the under-performing element, since the latter continues to be operational, albeit at a reduced level. The diverted request initiates a procedure whereby backup data is located and is used to generate the requested items of the data. By diverting requests from the under-performing element so as to generate the requested items of the data, the overall performance of the storage system improves.

The description above provides a method for measuring the performance of an element of a storage system, for determining an under-performing element, and for reducing the load on the under-performing element thereby improving the overall performance of the storage system. Variations on these methods are included in the scope of the present invention. For example, either or both of the configuration values used in flowcharts 100 and 200, namely the permitted deviation from the benchmark and the preset fraction of the requests to be diverted, may be configured by operator 16 so as to optimize an overall system performance. Alternatively or additionally, either or both of the configured values may be varied dynamically, typically according to the level of under-performance of the under-performing elements. Further alternatively or additionally, the extra resources used by the system in performing diversions may be measured, and the operator 16 may configure the system not to divert requests for specified items of the data according to the measurement.

Embodiments of the present invention are also able to divert requests to over-performing elements. As for under-performing elements, over-performing elements may be determined by finding if the queue length for any given element deviates from the average by more than a permitted deviation, not necessarily the permitted deviation used for determination of under-performing elements. The deviation for over-performing elements is in the opposite direction to that of under-performing elements.

To record over-performance, rather than flags 45 having two states, the flags may be implemented to have three states recording under-performance, over-performance, or performing within bounds permitted by the deviations. Hereinbelow these flag states are also respectively termed: set-under-performing, set-over-performing, and clear.

Figure 4:
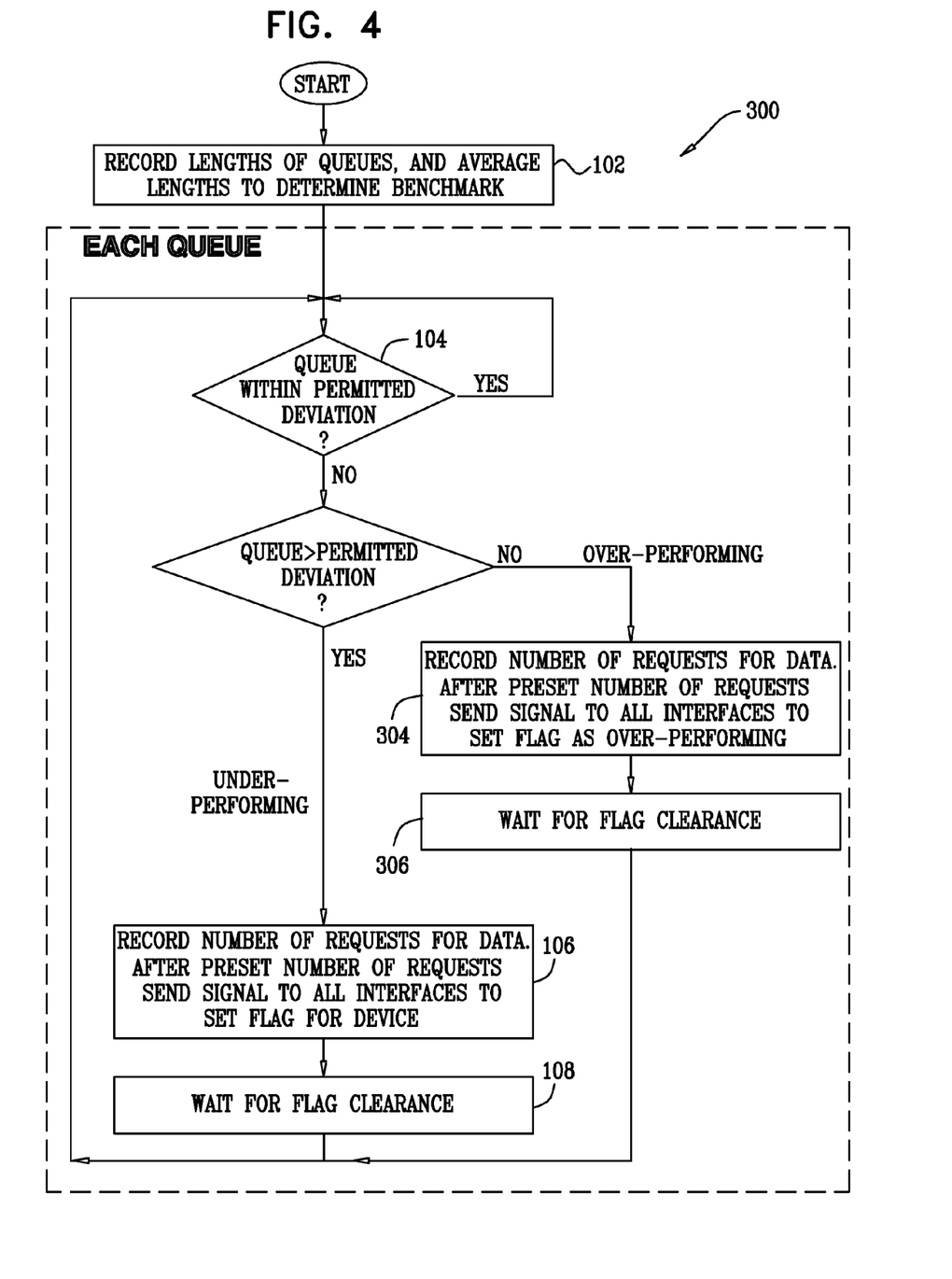
FIG. 4 is a flowchart of an alternative method for monitoring the performance of a data storage system, in accordance with an embodiment of the present invention.

FIG. 4 is a flowchart 300 of an alternative method for monitoring the performance of a data storage system, in accordance with an embodiment of the present invention. Flowchart 100 describes a process that sends a signal to set a flag 45 indicating under-performance, and waits for the flag to be cleared. Flowchart 300 describes a process that sends a first signal to the flag to indicate under-performance, or a second signal to indicate over-performance, and in either case waits for the flag to be cleared.

Except as described hereinbelow, flowchart 300 is generally similar to flowchart 100, so that steps having the same identifying numerals in both flowcharts are implemented in substantially the same manner.

In flowchart 300, a further decision step 302 follows decision step 104. Decision step 302 decides if the queue length is greater or less than the permitted deviation from the benchmark. The permitted deviation may be different in the two cases. For example, an element may be considered to be under-performing if its queue length is 10% higher than the benchmark, as described above for flowchart 100, and the element may be considered to be over-performing if its queue length is 5% lower than the benchmark.

If decision step 302 finds the element to be under-performing, the flowchart continues to steps 106 and 108, substantially as described above for flowchart 100. In these cases the signal sent in step 106 to interfaces 20 is an under-performing signal which sets the flag 45 of the element to its set-under-performing state, and step 108 waits until the flag state becomes clear.

If decision step 302 finds the element to be over-performing, the flowchart continues to a record step 304. Step 304 is generally similar to step 106, in that processing units 46 and management module 44 begin counting the number of requests for specified items of data received by the corresponding device 40Nn, and storing the count of requests in I/O count buffers 50. An over-performing signal is sent by processing units 46 and management module 44 to all interfaces 20 after another given number of requests is registered. The numbers of requests registered in steps 106 and 304, before transmission of their respective signals, may be different. For example, the number may be twenty for an under-performing element, corresponding to a 5% diversion from the element, but may be fifty for the element if is over-performing, corresponding to 2% diversion to the element.

Flowchart 300 continues to a waiting step 306, wherein processing units 46 wait for the flag set into the set-over-performing state to be cleared. On clearance, the flowchart returns to the beginning of decision step 104.

Figure 5:
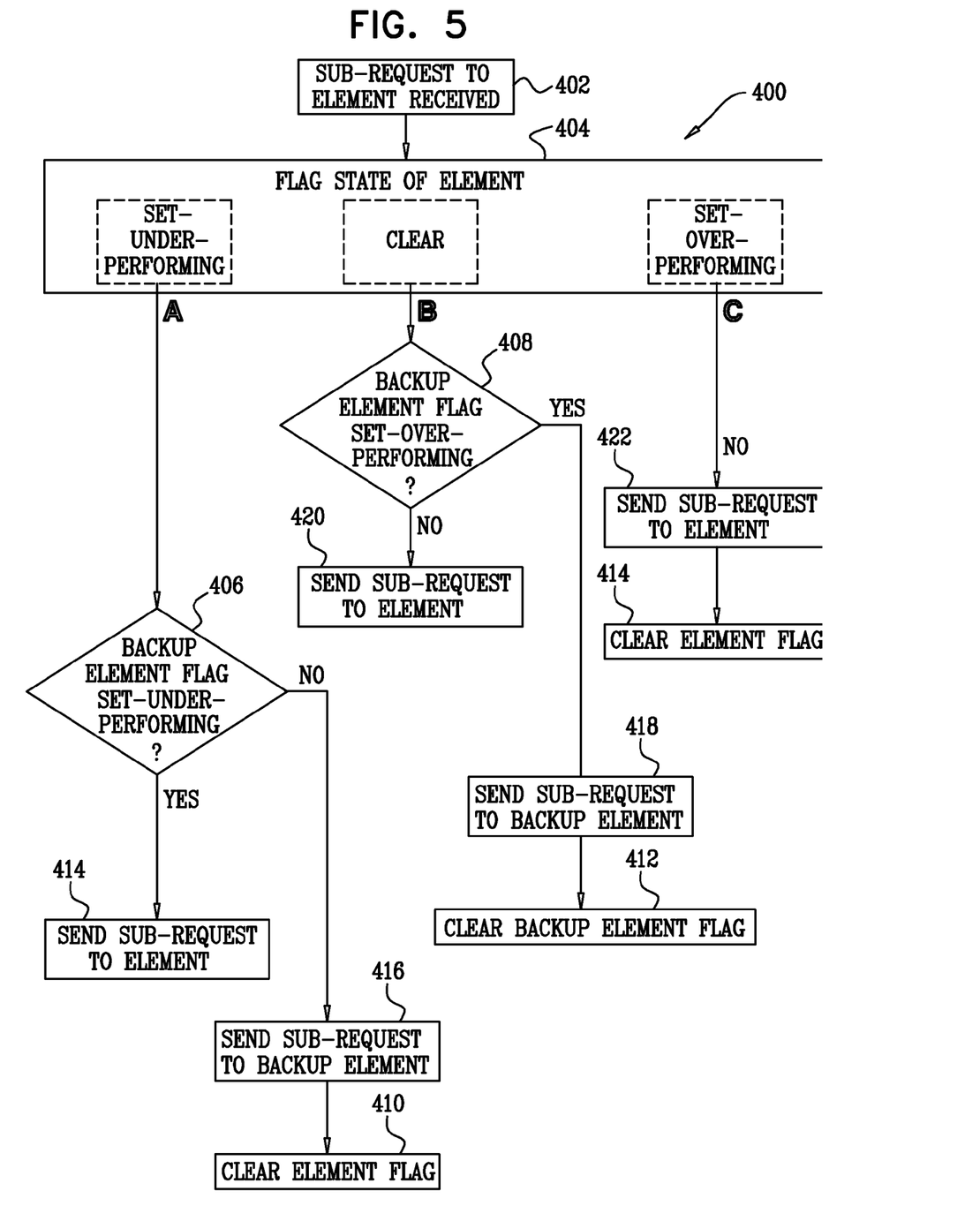
FIG. 5 is a flowchart showing steps taken at an interface of the storage system of FIG. 1, on receipt of a sub-request to an element of the system, according to an embodiment of the present invention.

FIG. 5 is a flowchart 400 showing steps taken at any interface 20, on receipt of a sub-request to an element, according to an embodiment of the present invention. In flowchart 400 it is assumed that each flag 45 in each interface may be in one of the states: set-under-performing, set-over-performing, and clear, and that the states of the flags are determined by operating flowchart 300 for each queue.

Flowchart 400 shows if a specific interface 20 sends a sub-request directed to a given element to the given element, or to a backup element that is able to answer the sub-request. For clarity and simplicity in the following description, for a given element there is assumed to be one backup element. Those having ordinary skill in the art will be able to adapt the following description, mutates mutandis, for cases where there is more than one backup element for a given element.

In an initial step 402, an interface 20 generates a sub-request directed to an operational element, herein assumed by way of example to be device 40A1, and also referred to herein as the targeted element.

In a flag-check step 404, the interface checks the state of flag 45A1. The flag will be in one of the three states: set-under-performing, set-over-performing, and clear.

If flag 45A1 is set-under-performing, then the flowchart proceeds along a path A to a decision step 406 wherein the interface uses processing units 46 to determine the backup device for 40A1, generally as described above for step 216 (flowchart 200). By way of example, the backup device is assumed to be 40B2. Once the backup device has been determined, interface 20 checks the state of flag 45B2, which may also be in three states.

If flag 45B2 is set-under-performing, then in a step 414 interface 20 forwards the sub-request to device 40A1. If flag 45B2 is not under-performing, i.e. is in a clear or set-over-performing state, then in a step 416 interface 20 sends the sub-request to backup device 40B2. In a clear flag step 410 flags for the targeted element, herein flags 45A1, in all the interfaces are cleared, so that waiting step 108 of flowchart 300 terminates for device queue 40A1Q (and flowchart 300 returns to the beginning of decision step 104).

Returning to flag-check step 404, if flag 45A1 is clear, then the flowchart proceeds along a path B to a decision step 408 wherein interface 20 checks the state of the flag of the backup element, herein flag 45B2.

If flag 45B2 is set-over-performing, then in a step 418 interface 20 forwards the sub-request to backup device 40B2. In a clear flag step 412, flags 45B2 are cleared, so that waiting step 306 of flowchart 300 terminates for the backup device queue 40B2Q.

If flag 45B2 is not over-performing, i.e., is in a clear or a set-under-performing state, then in a step 420 interface 20 sends the sub-request to device 40A1.

Returning again to flag-check step 404, if flag 45A1 is set-over-performing, then in a path C and a step 422 interface 20 sends the sub-request to device 40A1. In a clear flag step 414, flags 45A1 are cleared, so that step 306 of flowchart 300 is implemented for device queue 40A1Q.

Consideration of flowchart 500 shows that embodiments of the present invention are able to compensate for under-performing elements by directing some requests away from the elements, and that these requests may be directed to over-performing elements. Similarly, compensation is provided for over-performing elements by directing some requests to the elements. The performance of system 10 is improved by applying these compensations.

The description above has assumed that sub-request diversions, to or from operational elements, are fixed percentages. The description has also assumed that the permitted deviations (from an average) are fixed. In some embodiments the percentages and/or the permitted deviations may be allowed to vary, typically according to the state of the storage system. As one example, if a spread or variance of queue lengths increases, then values of the permitted deviations may be increased, or may be made a function of the spread or variance. As a second example, the percentages may be changed according to how much the queue length of an element is different from its permitted deviation: if the queue length is different from its permitted deviation by a relatively large amount, the percentage diversion to or from the element may be increased; if the queue length is different from its permitted deviation by a relatively small amount, the percentage diversion to or from the element may be reduced. Other examples of varying percentages and/or permitted deviations will be apparent to those of ordinary skill in the art, and are included within the scope of the present invention.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

We claim:

1. A method for operating a storage system, comprising:
   storing data redundantly in the storage system;
   measuring respective queue lengths of input/output requests to operational elements of the storage system;
   determining an average queue length of the operational elements;
   determining a performance benchmark for the storage system, the performance benchmark being the average queue length of the operational elements plus a predetermined percentage set by a user;
   comparing each of the respective queue lengths to the average of the queue lengths so as to determine respective performances of the operational elements of the storage system;
   identifying, in response to the average of the queue lengths and the performance benchmark, an under-performing operational element among the operational elements;
   providing an indication of the under-performing operational element to host interfaces comprised in the storage system, the indication identifying that the performance benchmark has been reached;
   receiving requests at one of the host interfaces for specified items of the data directed to the under-performing element; and
   in response to the indication, diverting a preset percentage of the requests for the specified items of the data directed to the under-performing element from the under-performing operational element to one or more other operational elements of the storage system that are configured to provide the specified items of the data.

2. The method according to claim 1, wherein diverting the preset percentage comprises registering all requests to the under-performing element and diverting the preset percentage of all of the requests to the one or more other operational elements.

3. The method according to claim 2, wherein the preset percentage is selected so that an overall performance of the storage system is optimized.

4. The method according to claim 1, wherein storing the data redundantly comprises storing the data according to at least one of a RAID (Redundant Array of Independent Disks) 0 and a RAID 1 storage scheme.

5. The method according to claim 1, wherein storing the data redundantly comprises storing the data according to at least one of a RAID 3, a RAID 4, a RAID 5, and a RAID 6 storage scheme.

6. The method according to claim 1, wherein the requests comprise a first set of sub-requests and a second set of sub-requests derived from a host-request to the system, and wherein diverting the preset percentage comprises:
   diverting the first set of sub-requests from the under-performing element to the one or more other operational elements and receiving a first set of respective sub-responses therefrom; and
   forwarding the second set of sub-requests to the one or more other operational elements and receiving a second set of respective sub-responses therefrom,
   and further comprising collecting the first and second set of sub-responses so as to provide a host-response to the host-request.

7. A method for operating a storage system, comprising:
   storing data redundantly in the storage system;
   measuring respective queue lengths of input/output requests to operational elements of the storage system;
   determining an average queue length of the operational elements;
   determining a performance benchmark for the storage system, the performance benchmark being the average queue length of the operational elements plus a predetermined percentage set by a user;
comparing each of the respective queue lengths to the average of the queue lengths so as to determine respective performances of the operational elements of the storage system;
identifying, in response to the average of the queue lengths and the performance benchmark, an over-performing operational element among the operational elements;
providing an indication of the over-performing operational element to host interfaces comprised in the storage system, the indication identifying that the performance benchmark is exceeded;
receiving requests at one of the host interfaces for specified items of the data directed to one or more of the operational elements other than the over-performing element;
in response to the indication, confirming that the over-performing element is configured to provide at least some of the specified items of the data in response to at least one of the requests; and
diverting the at least one of the requests to the over-performing operational element.

8. The method according to claim 7, wherein diverting the at least one of the requests comprises registering all requests to the over-performing element, computing a preset fraction of all the requests, and diverting the preset fraction of the requests received at the one of the host interfaces to the over-performing element.

9. The method according to claim 8, wherein the preset fraction is selected so that an overall performance of the storage system is optimized.

10. The method according to claim 7, wherein storing the data redundantly comprises storing the data according to at least one of a RAID (Redundant Array of Independent Disks) 0 and a RAID 1 storage scheme.

11. The method according to claim 7, wherein storing the data redundantly comprises storing the data according to at least one of a RAID 3, a RAID 4, a RAID 5, and a RAID 6 storage scheme.

12. The method according to claim 7, wherein the requests comprise a first set of sub-requests and a second set of sub-requests derived from a host-request to the system, and wherein diverting the at least one of the requests comprises:
diverting the first set of sub-requests to the over-performing element from the one or more other operational elements and receiving a first set of respective sub-responses therefrom; and
forwarding the second set of sub-requests to the one or more other operational elements and receiving a second set of respective sub-responses therefrom,
and further comprising collecting the first and second set of sub-responses so as to provide a host-response to the host-request.

13. A method for operating a storage system, comprising:
storing data redundantly in the storage system;
measuring respective queue lengths of input/output requests to operational elements of the storage system;
determining an average queue length of the operational elements;
determining a performance benchmark for the storage system, the performance benchmark being the average queue length of the operational elements plus a predetermined percentage set by a user;
comparing each of the respective queue lengths to the average of the queue lengths so as to determine respective performances of the operational elements of the storage system;
identifying, in response to the average of the queue lengths and the performance benchmark, an under-performing operational element among the operational elements;
identifying, in response to the average of the queue lengths and the performance benchmark, an over-performing operational element among the operational elements;
providing a first indication of the under-performing operational element and a second indication of the over-performing operational element to host interfaces comprised in the storage system, the first indication identifying that the performance benchmark has been reached;
receiving requests at one of the host interfaces for specified items of the data directed to the under-performing element;
in response to the first indication, diverting a preset percentage of the requests for the specified items of the data directed to the under-performing element from the under-performing operational element to one or more other operational elements of the storage system that are configured to provide the specified items of the data;
in response to the second indication, confirming that the over-performing element is configured to provide at least some of the specified items of the data in response to at least one of the requests; and diverting the at least one of the requests to the over-performing operational element.

14. The method according to claim 1, wherein the predetermined percentage set by the user is ten percent.

15. The method according to claim 14, wherein the preset percentage is five percent.

16. The method according to claim 7, wherein the predetermined percentage set by the user is ten percent.

17. The method according to claim 13, wherein the predetermined percentage set by the user is ten percent.

18. The method according to claim 17, wherein the preset percentage is five percent.

* * * * *